United States Patent [19]
Adams

[11] Patent Number: 5,680,218
[45] Date of Patent: Oct. 21, 1997

[54] OPTICAL GAGING SYSTEM

[76] Inventor: Bruce L. Adams, 21 Brookhill Rd., Hamden, Conn. 06514

[21] Appl. No.: 853,440

[22] Filed: Mar. 18, 1992

[51] Int. Cl.$^6$ .................................................. G01B 11/10
[52] U.S. Cl. .................................................. 356/385
[58] Field of Search .................... 356/381, 384, 356/385, 386, 387, 23

[56] References Cited

U.S. PATENT DOCUMENTS

| | | |
|---|---|---|
| 3,146,350 | 8/1964 | Topfer . |
| 3,856,411 | 12/1974 | Zanoni . |
| 4,074,938 | 2/1978 | Taylor . |
| 4,129,384 | 12/1978 | Walker et al. . |
| 4,160,599 | 7/1979 | Sperrazza ........................ 356/381 |
| 4,199,259 | 4/1980 | Harris . |
| 4,201,476 | 5/1980 | Musto et al. . |
| 4,294,545 | 10/1981 | Stutz . |
| 4,492,473 | 1/1985 | Richter et al. . |
| 4,511,253 | 4/1985 | Glockner . |
| 4,648,718 | 3/1987 | Sadamitsu . |
| 4,778,271 | 10/1988 | Kuwabara et al. . |
| 4,871,910 | 10/1989 | Venor et al. . |
| 4,978,223 | 12/1990 | Kutchenriter et al. . |
| 4,982,102 | 1/1991 | Inoue et al. . |
| 5,010,412 | 4/1991 | Garriss ........................... 356/23 |

FOREIGN PATENT DOCUMENTS 0286709  12/1986  Japan .......................... 356/385

*Primary Examiner*—Richard A. Rosenberger
*Attorney, Agent, or Firm*—Robert H. Montgomery

[57] ABSTRACT

A system for gaging the thickness of strip material, comprising a linear array of a multiplicity of individual photosensitive elements, in which strip travels essentially perpendicular to the linearity of said array, means including a pulsable light source providing a collimated beam to the array with the strip therebetween, means for sequentially addressing each element of the array in a predetermined time, means responsive to a predetermined time after the end of addressing each of the elements at the end of sequence for energizing and pulsing the light source, whereby after upon each pulsing of the light source with the strip imaged against array. The cells are sequentially interrogated to determine the number of light occluded cells.

12 Claims, 3 Drawing Sheets

OPTICAL GAGING SYSTEM

FIELD OF THE INVENTION

This invention relates to gaging devices, and more particularly relates to photo-sensitive electrical gaging devices on which an object may be imaged across an array of photo-sensitive electrical elements to determine the thickness thereof.

BACKGROUND OF THE INVENTION

It is well known in the electro-optical gaging art to image strip material across a linear array of photo-sensitive elements which measure a dimension of incident light from the strip or, alternatively, the dimension of occluded light against a lighted background.

In some cases the intensity of light emitted or reflected from the strip material may vary with time or other conditions. An example is drawn wire which, due to its heat, emits infrared. Depending on the speed of draw, the possibility of line stoppages, etc., the amount of infra-red may vary leading to a calibration problem in the gaging system. The same problem, may occur in the reverse system where the background is lighted and the light may not be capable of precise regulation.

A typical photo-sensitive array comprises a linear array of equally spaced photo-sensitive diodes together with an associated switch of each diode. The diodes are back biased and have an inherent parallel capacitance. Each time the array is scanned, the switches are sequentially closed and the diode capacitance is charged. The capacitance discharges through the back-biased diode as a function of light intensity incident on the diode. The diodes may be considered as equivalent to variable resistances which provide a discharge path for the capacitance. The time of discharge therefor varies as a function of the incident light. When an object is imaged on the array, the light emanating or reflected from the object will render some diodes conductive, thus producing capacitive discharge. Then, during the next scanning cycle, as the diodes are sequentially interrogated, the number of charging pulses are counted. This count is then indicative of the thickness of the object imaged on the array.

Since the capacitance charge time varies with incident light intensity, a scan cycle should not be initiated until sufficient time has passed for the capacitance to charge.

U.S. Pat. No. 4,160,599 discloses a system having new and improved means of maintaining calibration of an electro-optical gaging system of the type described in which the repetition rate of initiation of a scan is carried out as a function of light intensity. As of the time of issuance of this patent this was a substantial advance in the art. However it has since been determined that the product being measured and movement thereof in a plane perpendicular to the optical axis may create errors on measurement in that a smearing effect occurs at the edges of the measurement and this may be particularly due to vibration in other than the axis of movement of the product which is being measured. Some times this will produce what is called smear or ambiguous video signals as will hereinafter be described.

Accordingly, the present invention provides a new and improved optical gaging system which gages the wire or rod stock passing between a collimated light beam and a photo sensor array which is periodically pulsed and which will eliminate any errors due to vibration in other than the axial direction of the stock being gaged.

An object of this invention is to provide a new and improved optical gaging system for moving stock.

Another object of this invention is to provide a new and improved gaging system for accurately gaging the dimension of rod or strip stock moving past a sensor where the stock may be subject to vibration perpendicular to the axis of the stock.

A further object of this invention is to provide a new and improved optical gaging system which will very quickly determine the dimension of rod or strip stock moving past a given sensor in a short amount of time and obviate any problems due to vibration because of the moving material past the sensor.

SUMMARY OF THE INVENTION

Briefly stated, the invention in one form thereof comprises a system for gaging the thickness of strip material, comprising a linear array of a multiplicity of individual photosensitive elements, in which strip travels essentially perpendicular to the linearity of said array, including a pulsable light source providing a collimated beam to said array with the strip therebetween, means for sequentially addressing each element of said array in a predetermined time, means responsive to a predetermined time after the end of addressing each of said elements at the end of a sequence for energizing and said pulsing said light source, whereby upon each pulsing of said light source the strip is imaged against said array, and means for determining the number of elements in said array from which light from said source is occluded by the strip.

The features of the invention which are believed to be novel are particularly pointed out and distinctly claimed in the concluding portion of this specification. The invention, however, together with further objects and advantages thereof may best be appreciated by references to the following detailed description taken in conjunction with the drawings.

DETAILED DESCRIPTION OF PREFERRED EMBODIMENTS OF THE INVENTION

Figure 1:
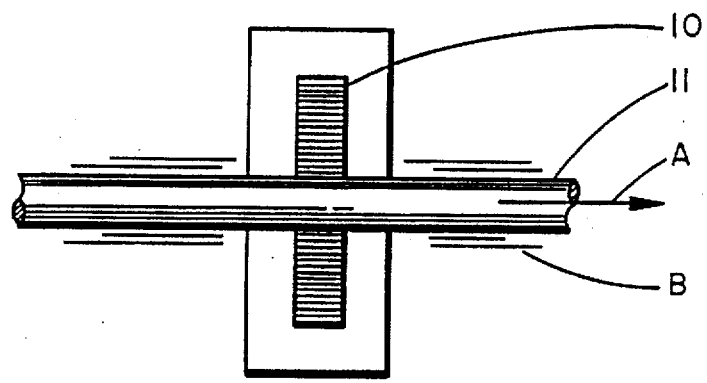
FIG. 1 is a diagram of a section of strip material moving in front of a optical sensor.

Reference is now made to FIG. 1 which exemplifies a diode array 10 which may be a 1024 or a 2048 element photo diode array of a type hereinafter described. FIG. 1 also exemplifies a strip material 11 moving in the direction of arrow A which will occlude a portion of the diode array 10 or otherwise stated a given number of photo sensitive diodes as hereinafter described, in order that a measurement may be made of the diameter of the strip 11.

In such a system the photo diodes are charged to a given level and then discharge and when on a time basis a certain number are occluded from light thereon a measurement may be made of the number of occluded diodes with resultant computation of the diameter of the stock 11.

However, in some instances there is vibration of the strip which may be perpendicular to the direction of travel A as exemplified by the lines B. This may cause a smeared or ambiguous signal from the photo diodes with a resulting ambiguous or erroneous signal of the actual diameter of the stock 11.

In practice, periodically each of the photo diodes are serially addressed to determine the degree of light intensity thereon and the number of light occluded diodes in comparison to the total number will give an accurate indication of the measurement of the strip material. The photo diodes as previously stated are serially addressed and the output of each is amplitude discriminated to determine whether the diode has been occluded or has been subjected to light from a light source and at the end of the address cycle or end of scanning cycle a signal is generated. In addition there will generally be a start of scan signal on a timed basis and what is termed an integration time or period for the photo diodes to charge.

Figure 2:
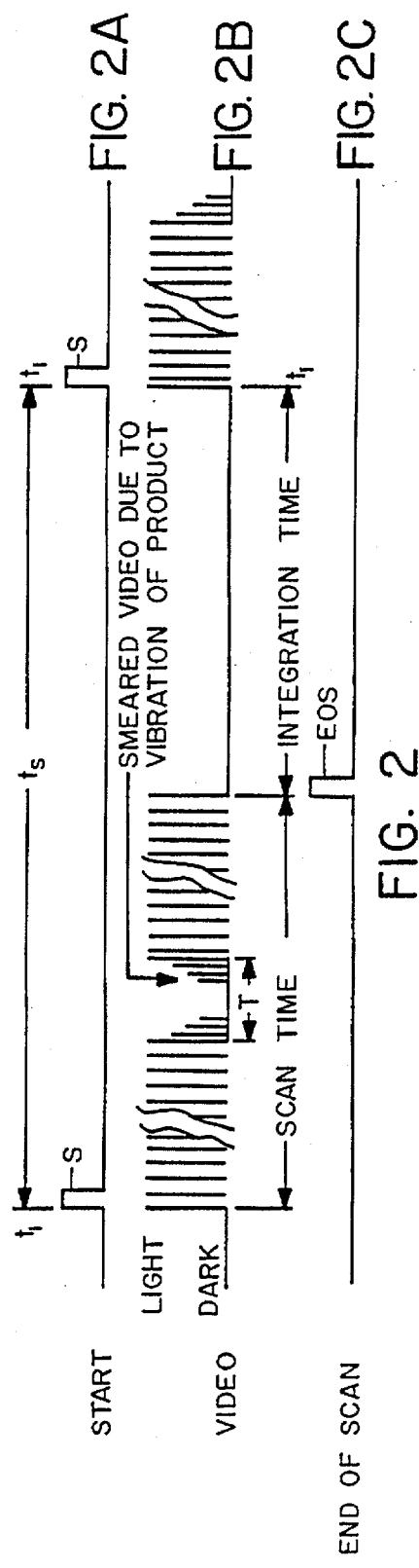
FIGS. 2A–2C are timing diagrams which are typical of a prior art system.

This is exemplified in FIGS. 2A, 2B and 2C in which FIG. 2A indicates the set timing of start scanning pulses to initiate a scanning cycle;

FIG. 2b exemplifies the pulses which may occur from each of the photodiodes during a set scanning time and then thereafter there is a pause or integration time to permit the photodiodes to recharge for another measurement FIG. 2C from a timing standpoint exemplifies an end of scan signal EOS which is generated by the overflow of an address register after the array has been scanned.

It will be noted that in the middle of the scan time when some photodiodes are occluded there are pulses, hereinafter referred to as video pulses, which due to vibration of the stock being measured may give a smearing effect and provide ambiguous video signals as indicated in the time T, FIG. 2B.

It is the problem of smearing of signals and the effect of measurements thereon which the present invention suppresses or overcomes.

Figure 3:
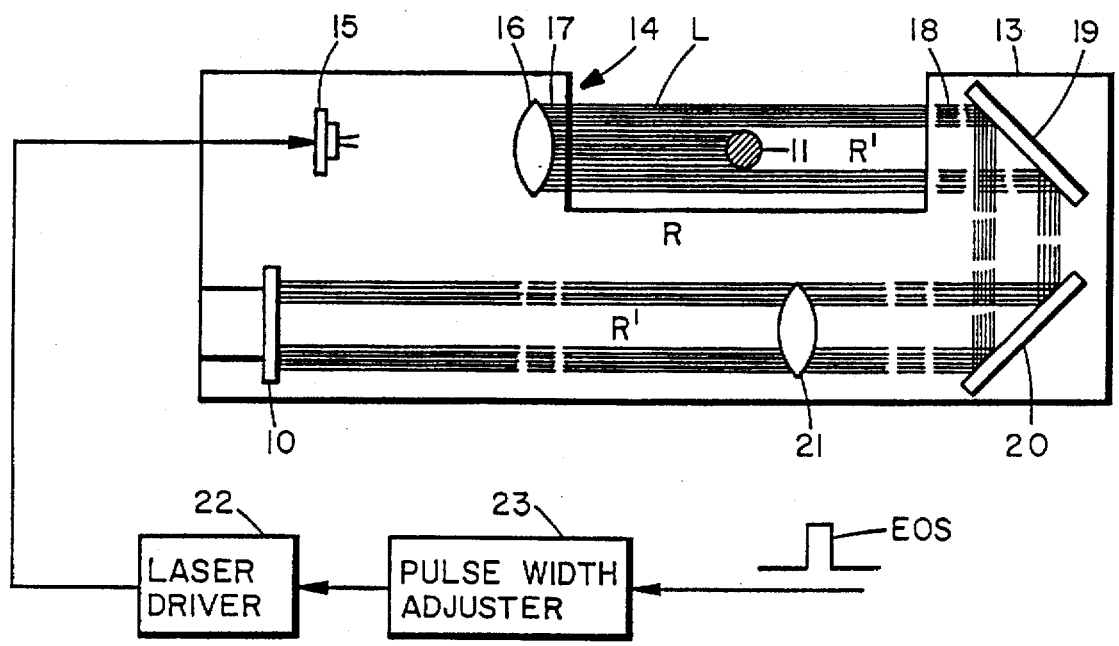
FIG. 3 is a diagram which is partially schematic of a portion of an optical gaging system in which the invention is embodied.

Reference is now made to FIG. 3 which exemplifies partially schematically a housing for the light source and detection system utilized with the photo diode array 10.

A housing 13 has a recess 14 therein through which the strip 11 passes. A laser diode 15 provides a beam of monochromatic light to a collimating lens system identified as 16 which will send collimated light L between locations 17 and 18. For purposes of illustration the beam L is shown as a multiplicity of rays R. As will be readily seen the strip 11 will occlude a certain dimension of the collimated light beam which is identified by the multiple rays R. The light occluded diodes will yield a measurement of the dimension of the strip perpendicular to its direction of movement.

The rays R of light beam L are directed by mirrors 19 and 20 through another lens system 21 to the photo diode array previously identified by the reference numeral 10 in FIG. 1. It will be seen that the strip 11 occludes a dimension $R^1$ of the rays R. This is the dimension to be determined.

The light source 15 in accordance with the invention is a laser diode 15 which is pulsed periodically, as hereinafter described, by a laser driver 22 which receives a pulse of predetermined width though a pulse width adjuster 23 at the time of reception of an end of scan pulse EOS as will hereinafter be described. The laser diode 15 will be pulsed on for a time determined by the pulse from pulse width adjuster 23.

Figure 4:
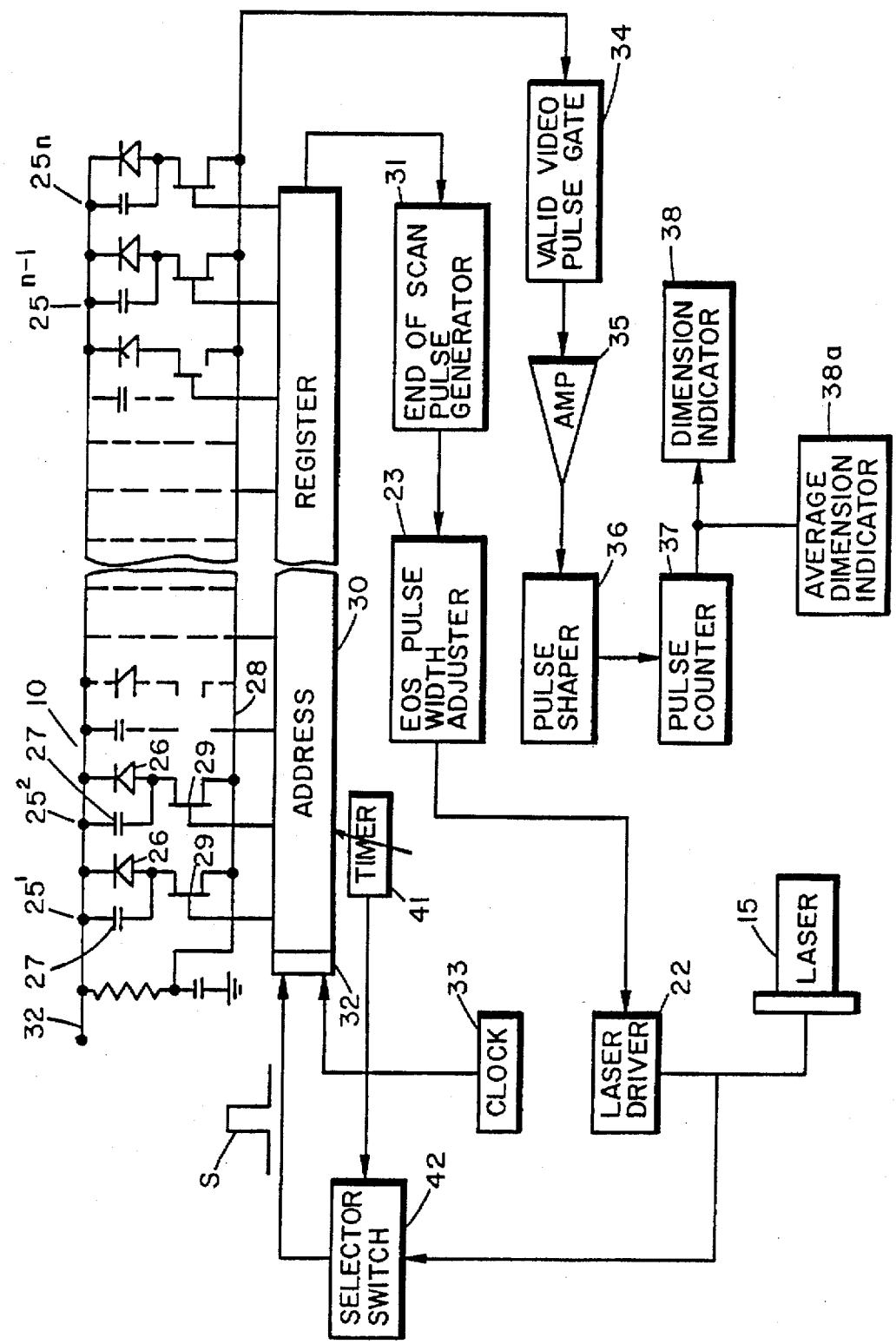
FIG. 4 is a diagram partly schematic and partly in block form of a system embodying the invention.

Reference is now made to FIG. 4 which further describes the photo diode array and the accompanying logic circuitry.

FIG. 4 exemplifies a typical linear array of photo diodes previously shown in FIG. 1 and exemplified by the reference numeral 10 together with accompanying circuitry. Each photo diode and accompanying circuitry may be termed a cell. Each cell $25^1$ through $25^n$ includes a back biased photo sensitive diode 26 having an inherent capacitance 27. Each cell is connected to an output line 28 which is at virtual ground through a switch shown as a transistor 29. The transistor switches 29 are serially turned OFF and ON by an address register 30 in the form of a shift register to interrogate each cell. Address register 30 is driven by pulses from a clock frequency generator identified as clock 33 when a gate 32 is opened by a start scan pulse S. Between scanning cycles the charge on each capacitance 27 decreases as current discharges through its diode 26. This current is a function of the light intensity incident on the diode, and diode sensitivity. The loss of charge is replaced during each scan cycle when the capacitances are recharged by completing a circuit through a transistor 29.

A charge pulse appears as each cell is addressed by the address register 30 closing its associated transistor switch 29. Such pulses are proportional to the light intensity on each diode and the leakage current or otherwise stated the total discharge of the capacitance. The charging pulses supplying only dark leakage current are very small compared to those charging the capacitances of illuminated cells and may be amplitude discriminated as hereinafter described. Then by counting the charge pulses during each scan cycle, the width of an object imaged on an array of diodes of known uniform spacing may be determined.

The pulses appearing on output line 28 are applied to a pulse height discriminator shown as valid video pulse gate 34. Then, by counting the charge pulses during each scan cycle, the width of an object imaged on an array of diodes of uniform spacing may be determined. The pulses appearing on line 28 after passing through the valid video pulse gate 34 are applied to an amplifier 35, and those pulses representative of charging pulses to each cell due to light incidence on the diode of each cell and above a threshold are shaped to rectangular pulses by a pulse shaper 36. The output of pulse shaper 36 is applied to a pulse counter 37 which then will supply an output to a dimension indicator 38 which indicates dimension as a function of the occluded cells. Not all cells of an array need be utilized. For example, in a 2048 cell array, only 2000 are usually used. Then the linear dimension D of the array indicates that each cell represents a dimension of D/2000.

Dimension Indicator 38 may also include a time average dimension indicator function 38a to display the average of a predetermined number of scans.

An overflow pulse from the address register 30 is applied to an end of scan pulse generator 31 which may take any appropriate configuration such as a schmidt trigger. The end of scan pulse generator provides a signal to an end of cycle pulse width adjustor 23 which provides a pulse of predetermined width to laser driver 22.

The width adjusted end of scan pulse is then applied to pulse laser 15 ON for the time of the width adjusted end of cycle pulse. When laser 15 turns ON the light therefrom is focused by lens system 21 onto the diode array 10. As light strikes a particular cell a charge is built up proportional to the amount of incident light, that is light intensity and time of incidence. Between scanning cycles the charge on the capacitance of each cell decreases as current discharges through its diode. This is sometimes referred to as integration time. Thereafter, as the cells are scanned by address register 30, the cells are charged. If the charge pulse exceeds a reference level, as determined by valid video pulse gate 34, it is determined to be an illuminated cell. Similarly, if the charge pulse does not exceed the reference level then it is considered to be a dark cell, i.e. one which is occluded by strip 11.

Clock 33 is free running and will activate address register 30 for a scan when gate 32 is opened by a start scan pulse S from a selector switch 42. Selector switch may apply a start pulse to gate 32 upon the trailing edge of the laser driver pulse or the start of scan pulse may be determined by a variable timer 43 as herein after discussed.

Figure 5:
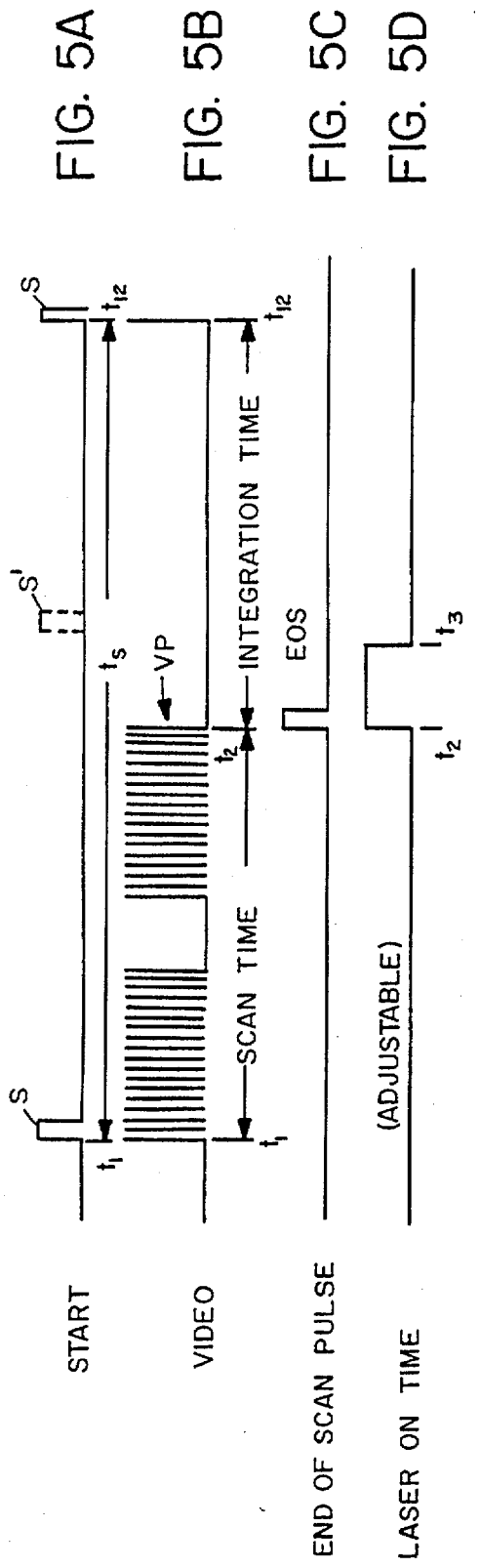
FIGS. 5A–5D are timing diagrams found in the system of FIG. 4.

Reference is now made to FIGS. 5A–5D for further explanation of the system. FIG. 5A exemplifies the start scan pulses S which occur at times $t_1$, and are separated for a predetermined time $t_s$, determined by timer 43.

At time $t_1$, gate 32 opens and the clock pulses serially address and interrogate each active cell of the array. This produces the video pulses VP (FIG. 5B) on output line 28. The video pulses continue until the scan ends at time $t_2$.

The last interrogatory pulse of a scan (overflow of register 30) occurs at time $t_2$, and triggers end of scan pulse generator 31 which generates end of scan pulse EOS at time $t_{s2}$ (FIG. 5C). The EOS pulse is applied to EOS pulse width adjuster 23 and the EOS pulse is pulse width adjusted to a predetermined time width $(t_2-t_3)$, FIG. 5D.

During time $t_2-t_3$, the laser diode is pulsed ON and the capacitance 27 of each illuminated cell discharges through its associated diode 26. The laser diode ON time is defined by steep leading and trailing edges at times $t_2$ and $t_3$, respectively.

The time $t_s$ may be varied by timer 43, or may be terminated at time $t_3$ at the trailing edge of the laser drive pulse, and a new scan then started.

As shown in FIG. 5B, the time $t_2$ to $t_{12}$ maybe termed an integration time during which time the cells of the array discharge. Dependent on the repetition rate desired of scans the time $t_2-t_{12}$ maybe substantially shortened or eliminated dependent on the intensity of the laser and time $t_2-t_3$.

The invention provides a much improved measurement system that can be used for many more applications than were previously possible. By pulsing the laser diode ON for a short period of time during the integration period a strobing or stopped motion effect is provided which eliminates errors due to strip vibration or movement perpendicular to its direction of movement.

Typical times which may be involved are a scanning time of one millisecond and an integration period of the same time. The laser diode ON period $(t_2-t_3)$ may be 0.1 to 0.5 millisecond, and as previously stated time $t_3-t_{12}$ may be reduced to give more scanning cycles in a given time.

With an array of two thousand cells, as previously pointed out, and a scanning time of one millisecond, the clock pulse frequency is two megahertz. The address register 30 will overflow one clock pulse after the last count pulse of a pulse train from cell 25n. The overflow pulse from address register 30 at the end of a scanning cycle thus provides generation of an end of scanning cycle signal essentially coincident in time with the lost pulse of the pulse train from array 10 which is applied to counter 37.

It may thus be seen that the objects of the invention set forth, as well as those made apparent from the foregoing description, are efficiently attained. While a preferred embodiment of the invention has been set forth for purposes of disclosure, modification to the disclosed embodiment of the invention, as well as other embodiments thereof, may occur to those skilled in the art. Accordingly, the appended claims are intended to cover all embodiments of the invention and modifications to the disclosed embodiments(s) which do not depart from the spirit and scope of the invention.

What is claimed is:

1. A system for repetitively measuring the thickness of a moving strip comprising:

a linear array of photo-sensitive electrically conductive elements, each element including a capacitance which may discharge through the element at a rate dependent upon the intensity of light incident thereon, a switch in circuit with each element for completing a circuit therethrough, means for sequentially opening said switches to charge said capacitances in a scanning cycle and for generating an end of cycle signal at the end of a scanning cycle, said array producing a train of pulses from elements not occluded by a strip imaged across said array during a scanning cycle, means for imaging a strip across said array including a pulseable light source capable of emitting a light pulse having steep leading and trailing edges and means for pulsing said light source, means for counting charging pulses to each element of said array during a scanning cycle whereby the thickness of the strip is determined from the number of charging pulses to said elements, said means for sequentially opening said switches and generating an end of cycle signal providing said end of cycle signal essentially coincident in time with the last pulse of said train of pulses, and means responsive to said end of scanning cycle signal for generating a light source pulsing signal having steep leading and trailing edges and being of predetermined time duration, and applying said pulsing signal to said means for pulsing said light source.

2. The system of claim 1 where said pulseable light source is a laser diode.

3. The system of claim 1 further including means for adjusting the time duration of said end of cycle signal to adjust the ON time of said light source.

4. The system of claim 1 further including means for generating a start scan signal to commence a scanning cycle in response to the trailing edge of said light pulsing signal.

5. The system of claim 4 further including means for delaying the application of said start scan signal to commence a scanning cycle.

6. The system of claim 1 wherein the time of illumination of said light source is less than the time of a scanning cycle.

7. The system of claim 6 wherein the time of illumination of said light source is less than the time of a scanning cycle.

8. A system for repetitively measuring the thickness of moving strip material comprising:

a linear array of photosensitive elements, each element capable of emitting a pulse when illuminated, means including a pulseable light source capable of emitting a pulse of light having steep leading and training edges of imaging the strip across the array, and means for pulsing said light source, means for sequentially scanning said elements of said array to generate a train of pulses from said elements in a scanning cycle to determine the number of elements occluded by the imaged strip during a scanning cycle, means for counting the number of pulses from said array during a scanning cycle whereby the thickness of the strip is determined from the number of pulses emitted by said elements of said array, means for generating an end of scanning cycle signal essentially coincident in time with the last pulse of the pulse train, and said means for pulsing said light source receiving said end of scanning cycle signal and applying a light source pulsing signal having steep leading and training edges to said light source.

9. The system of claim 8 where said pulseable light source is a laser diode.

10. The system of claim 8 further including means for adjusting the time duration of said end of cycle signal to adjust the ON time of said light source.

11. The system of claim 8 further including means for generating a start scan signal to commence a scanning cycle in response to the trailing edge of said light pulsing signal.

12. The system of claim 11 further including means for delaying the application of said start scan signal to commence a scanning cycle.

* * * * *